United States Patent [19]
Hensel

[11] Patent Number: 5,433,529
[45] Date of Patent: Jul. 18, 1995

[54] FLUID BEARING CONSTRUCTION EMPLOYING THRUST PLATE WITH PRESSURE COMPENSATION PORTS

[75] Inventor: Robert J. Hensel, Gaston, Oreg.

[73] Assignee: Synektron Corporation, Portland, Oreg.

[21] Appl. No.: 284,812

[22] Filed: Aug. 2, 1994

[51] Int. Cl.⁶ ............................................. F16C 17/10
[52] U.S. Cl. ................................. 384/112; 384/113; 384/119; 384/123; 384/124
[58] Field of Search ............... 384/112, 113, 121, 119, 384/124, 123

[56] References Cited

U.S. PATENT DOCUMENTS

| | | | |
|---|---|---|---|
| 4,883,367 | 11/1989 | Maruyama | 384/112 |
| 4,892,418 | 1/1990 | Asada et al. | 384/123 |
| 5,018,880 | 5/1991 | Nakasugi et al. | 384/112 |
| 5,069,515 | 12/1991 | Itami et al. | 384/123 |

Primary Examiner—Lenard A. Footland
Attorney, Agent, or Firm—Chernoff, Vilhhauer, McClung & Stenzel

[57] ABSTRACT

A construction for a fluid bearing in a rotary spindle apparatus includes a spindle having first and second ends, and at least one thrust plate coupled to a shaft which is surrounded by a hub having an enclosing sleeve. The sleeve surrounding the thrust plate and shaft defines several gap regions where bearing fluid resides. A first radial gap region is defined between the shaft and sleeve and a second radial gap region is defined between the outer diameter of the thrust plate and the sleeve. A first axial gap region is defined by an upper surface of the thrust plate and the sleeve, and a second axial gap region exists between the lower surface of the thrust plate and the sleeve. A bearing fluid is disposed within these gap regions and forms capillary seals at first and second ends of the spindle. The thrust plate includes holes or pressure compensation ports which connect the first and second axial gap regions. The pressure compensation ports allow the bearing fluid to flow between the upper and lower thrust plate surfaces so that ambient pressure is maintained near the inner diameter of the thrust plate.

3 Claims, 2 Drawing Sheets

FLUID BEARING CONSTRUCTION EMPLOYING THRUST PLATE WITH PRESSURE COMPENSATION PORTS

BACKGROUND OF THE INVENTION

The present invention relates to a fluid bearing construction for an electric motor, and in particular to a fluid bearing construction that includes a thrust plate having pressure compensation ports.

Rotary spindle machines such as electric motors for disk drives may employ fluid bearings in lieu of traditional ball bearings for supporting the rotary member relative to the non-rotary member. An example of a fluid bearing construction is shown in my copending application, Ser. No. 08/226,310 entitled FLUID BEARING WITH ASYMMETRICAL GROOVE PATTERN which is assigned to the same assignee herein. Other fluid bearings are shown in the U.S. Pat. Nos. 5,112,142 to Titcomb, Shinohara 4,445,793 and Anderson 4,726,693.

Such devices typically include a shaft having at least one axial thrust plate and a hub, which may be a rotary hub, having a sleeve portion generally enclosing the shaft and thrust plate, thus forming a journal bearing with bearing fluid disposed therein. The bearing fluid will form capillary seals at one or more ends of the shaft that are exposed to ambient air pressure.

The problem with such constructions is that under certain conditions the capillary seal may break down and fluid may leak from the bearing. Disruption of the seal may be caused by shock or vibration. Under certain conditions the rotating portion of the bearing may be displaced along the axis of the shaft. In the normal course of events, lubricant flows around the end of the thrust plate from the side with decreasing clearance to the side with increasing clearance. If, however, because of sudden shock or vibration, the lubricant flow around the thrust plate is impeded, fluid will be pushed toward one end of the shaft or the other, possibly breaking down the surface tension which holds the seal in place.

Leakage may also occur when there are inaccuracies in the fabrication of the patterned grooves used by the thrust plate's upper and lower surfaces to maintain a desired net pressure gradient. The object of the grooves is to create a high pressure region in the middle of each thrust plate surface and to create ambient pressure zones at the inner diameter of the thrust plate, adjacent the shaft, and at the outer diameter in the gap between the radially outermost edge of the thrust plate and the sleeve. This type of pressure distribution ordinarily results in no displacement of bearing fluid, that is, the static pressures will equalize. However, fabrication inaccuracies do occur, as does tilt in the bearing, or any other physical phenomena, and these factors can alter the pressure balance in the bearing fluid resulting in flow across the bearing. The flow of bearing fluid can overcome the surface tension seal at either end of the bearing and cause the fluid to leak. The situation is particularly acute at the thrust plate end where pressure imbalances between the upper and lower surfaces of the thrust plate may create a net flow which is near the capillary seal at the upper surface of the thrust plate.

What is needed, therefore, is a construction for a fluid bearing which is capable of equalizing the fluid pressures around the thrust plate, particularly at the inner diameters. If these pressures are equalized, there will be no net flow out of the thrust plate region and, therefore, no breakdown of the capillary seal.

SUMMARY OF THE INVENTION

The present invention provides a construction for a fluid bearing in a rotary spindle apparatus which includes a spindle having first and second ends, and including at least one thrust plate coupled to a shaft which is surrounded by a hub having an enclosing sleeve. The sleeve surrounding the thrust plate and shaft defines several gap regions where bearing fluid resides. A first radial gap region is defined between the shaft and sleeve and a second radial gap region is defined between the outer diameter of the thrust plate and the sleeve. A first axial gap region is defined by an upper surface of the thrust plate and the sleeve, and a second axial gap region exists between the lower surface of the thrust plate and the sleeve. A bearing fluid is disposed within these gap regions and forms capillary seals at first and second ends of the spindle. The thrust plate includes holes or pressure compensation ports which connect the first and second axial gap regions. The pressure compensation ports allow the bearing fluid to flow between the upper and lower thrust plate surfaces so that ambient pressure is maintained near the inner diameter of the thrust plate.

The upper and lower thrust plate surfaces include patterned grooves which create a high fluid pressure region in the middle of each thrust plate surface. This in turn causes the fluid pressures at the inner and outer diameters of the thrust plate to be near ambient.

The pressure compensation ports are preferably holes having approximately a 0.50 mm bore located adjacent the inner diameter of the thrust plate. There should be at least two such pressure compensation ports, and in a preferred embodiment there are four such ports located 90° apart.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
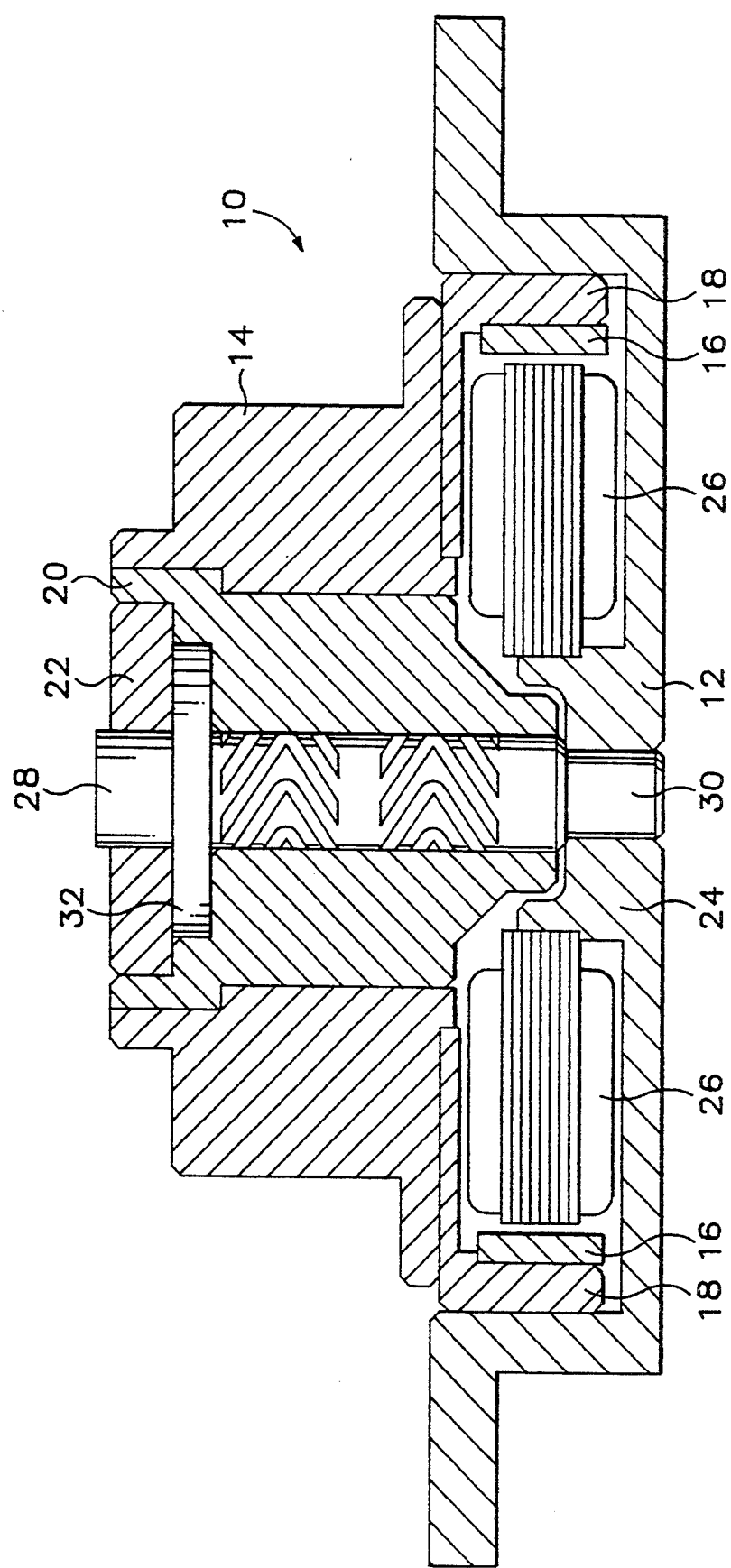
FIG. 1 is a side cutaway view of an electric motor employing the fluid bearing construction of the invention.

An electric motor 10 includes a stator portion 12 and a rotary hub 14. The rotary hub 14 includes a multi-pole ring magnet 16 held within magnet holder member 18. The rotary hub 14 includes a sleeve portion 20 and an end cap 22. The stator portion 12 includes a base 24 and stator coils 26. A spindle 28, about which the hub portion 14 rotates, includes a central shaft 30 and a thrust plate 32.

Figure 2:
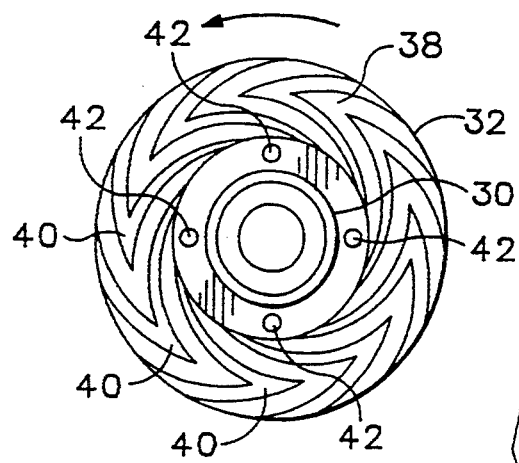
FIG. 2 is a top view taken along line 2—2 of FIG. 1 showing the upper surface of a thrust plate.
Figure 3:
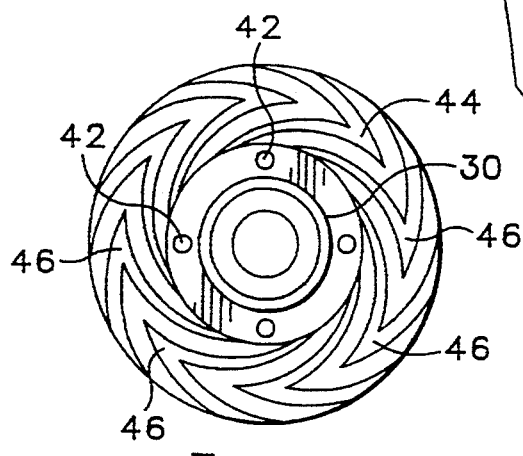
FIG. 3 is a bottom view taken along line 3—3 of FIG. 1 showing the bottom surface of a thrust plate.
Figure 6:
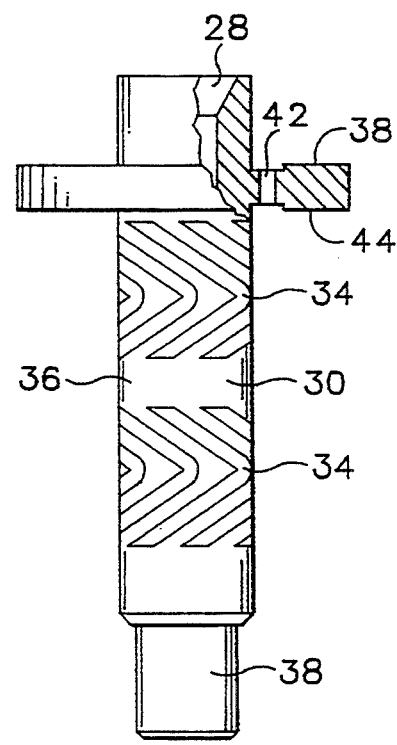
FIG. 6 is a partially cutaway side view of the spindle portion of the motor of FIG. 1.

Referring now to FIG. 6 the spindle 28 includes a central shaft 30 having asymmetric herringbone grooves 34 separated by a gap 36. The shaft 30 is tapered near the bottom portion 38 where it fits into the base 24. Referring now to FIGS. 2 and 3, the thrust plate 32 includes an upper surface 38 having patterned grooves 40. The purpose of the patterned grooves 40 is to create a high fluid pressure region near the middle of the thrust plate's surface. The thrust plate 32 includes pressure compensation ports 42 located near its inner diameter adjacent the shaft 30.

The lower thrust plate surface 44 is in all respects similar to the upper thrust plate surface 38 shown in FIG. 2 and also includes patterned grooves 46. The direction of the arrows in both FIGS. 2 and 3 represents the direction of rotation.

Figure 4:
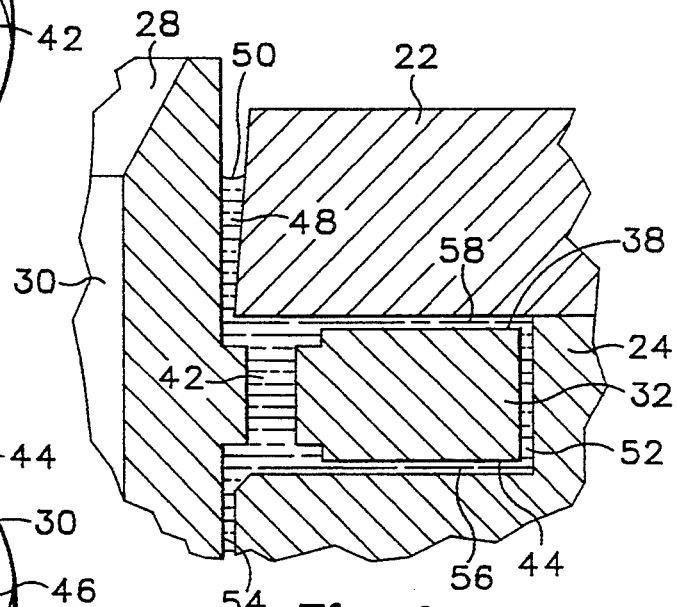
FIG. 4 is a partial cutaway, close-up side view of the motor of FIG. 1 showing an upper capillary seal and a portion of the thrust plate and shaft.
Figure 5:
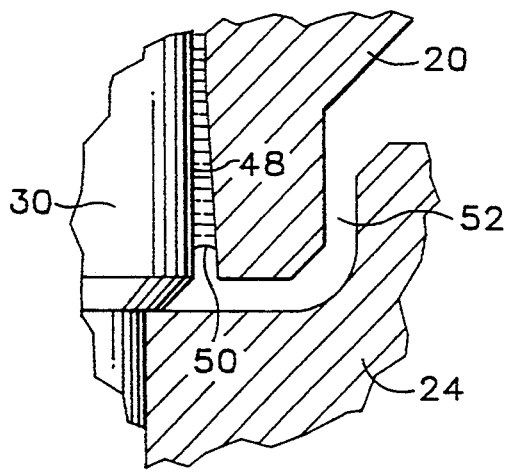
FIG. 5 is a partial cutaway, close-up view of the motor of FIG. 1 showing a lower capillary seal for the fluid bearing of the invention.

The spindle 28 including its associated shaft 30 and thrust plate 32 is surrounded entirely by a bearing fluid 48. This fluid may be any type of commercially available lubricant which is commonly used in fluid bearings of the type described herein. As shown in FIG. 4 and in FIG. 5 the lubricant 48 forms capillary seals 50a and 50b at each end of the shaft where the lubricant is exposed to ambient air pressure. In the case of the lower portion of the shaft 30 adjacent the base 24 there is a passage way 51 which vents to ambient pressure.

As shown most clearly in FIG. 4 the lubricant 48 resides in gaps between the spindle 28 and the sleeve 24 and end cap 22. At the outer diameter of the thrust plate 32 there is a radial gap region 52. There is also a radial gap 54 which exists between the shaft 30 and the sleeve 24. There is an axial gap region 56 between the lower surface 44 of the thrust plate 32 and the sleeve 24, and there is an upper axial gap region 58 between the upper surface 38 of the thrust plate 32 and the end cap 22.

The pressure compensation ports 42 connect the lower axial gap region 56 with the upper axial gap region 58. This permits the flow of bearing fluid 48 under dynamic conditions from one surface of the thrust plate to the other surface. Thus, in the event of dynamic shock or vibration, fluid may flow from one gap region to the other quickly to provide a pressure equalizing effect so that the capillary seals 50a and 50b will not be breached.

Preferably, the pressure compensation ports should have a bore of approximately 0.5 mm. This is for a motor whose base is approximately one inch in diameter. There may be more or fewer pressure compensation ports depending upon the application. Also, the size of the pressure compensation ports may be altered depending upon the particular requirements of the motor and the viscosity of the bearing fluid.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fluid bearing construction for a rotary spindle apparatus comprising:
   (a) a spindle having first and second ends and including at least one thrust plate coupled to a shaft;
   (b) a hub having a sleeve enclosing the spindle and defining a first radial gap region between the shaft and sleeve, a second radial gap region between the thrust plate and sleeve a first axial gap region between an upper surface of the thrust plate and the sleeve, and a second axial gap region between a lower surface of the thrust plate and sleeve;
   (c) a bearing fluid disposed in said gap regions and forming capillary seals at said first and second ends of said spindle; and
   (d) said thrust plate including pressure compensation ports connecting said axial gap regions to permit said bearing fluid to flow therebetween.

2. The bearing construction of claim 1 wherein the upper and lower thrust plate surfaces include patterned grooves for creating a high fluid pressure region in the middle of each thrust plate surface.

3. The bearing construction of claim 1 wherein the pressure compensation ports are located at an inner diameter of the thrust plate adjacent said shaft.

* * * * *